Sept. 20, 1938.  E. S. CISCO  2,130,678
COOKING UTENSIL
Filed Nov. 12, 1935
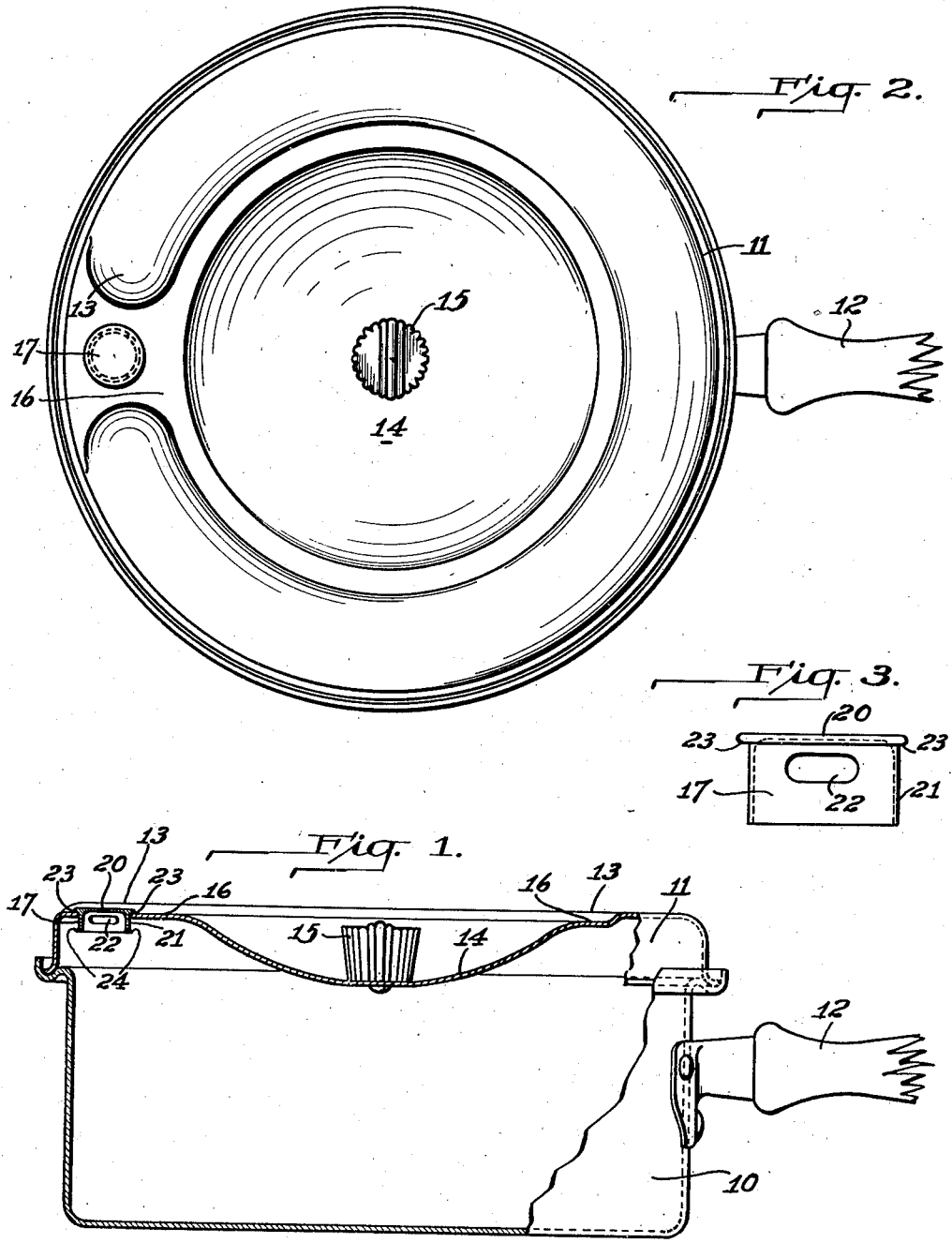
INVENTOR.
EDWARD S. CISCO
BY
his ATTORNEY.

Patented Sept. 20, 1938

2,130,678

UNITED STATES PATENT OFFICE 2,130,678

COOKING UTENSIL

Edward S. Cisco, New Kensington, Pa., assignor to The Aluminum Cooking Utensil Company, New Kensington, Pa., a corporation of Pennsylvania Application November 12, 1935, Serial No. 49,343

6 Claims. (Cl. 53—1)

This invention relates to cooking utensils, and more particularly to cooking utensils of aluminum or aluminum alloy.

In some instances it is desirable to stack cooking utensils one upon another in use because such stacking, among other advantages, permits greater utilization of space, of heat applied, and, if the utensils are made of aluminum or aluminum alloy, of the heat-conducting property of the aluminum. Prior to the present invention, however, it has not been possible to stack utensils without incurring difficulties, since such stacking requires the use of a vent in the side of the utensil to relieve the pressure which is built up inside of the utensil, and this vent reduces the capacity of the utensil. Such a vent is required whether the utensil has a tight cover or not, it being necessary to vent at least the lower utensils of the stack in either case.

Accordingly, it is an object of the present invention to provide a utensil which may be stacked with other utensils in use. Another object is to provide a utensil vented for stacking without reducing its capacity. Another object is to provide a stacking arrangement for utensils which conserves heat and space. Other objects and advantages will appear as the description proceeds.

For the purposes of illustration, I will describe the preferred form of my invention as applied to a particular type of utensil, reference being had to the accompanying drawing, in which:

Fig. 1 is a partial vertical sectional view of a cooking utensil embodying my invention;

Fig. 2 is a top plan view of the same; and

Fig. 3 represents one form of vent valve which may be used with utensils embodying my invention.

The cooking utensil comprises a vessel 10 and a cover 11. The vessel 10 preferably has straight sides as shown, but may be of any desired form and may have a handle such as that shown at 12 or may have any type of handle. The vessel is preferably flat-bottomed as shown, but it is essential only that the bottom have a flat area of sufficient extent to serve as a stacking surface.

In the form shown, the cover 11 has a flat portion 13 to serve as a stacking surface. Centrally of the cover there is shown a depressed portion 14 in which a knob 15 is located. A second shallow depressed portion 16 extends to the outer edge of the cover 11. Disposed in this second depressed portion 16 is a vent closed by a vent valve 17.

It is to be understood that the form shown is merely for purposes of illustration and may be modified within the terms of my invention. In the form of cover shown, the vent and vent valve 17 may be placed in the central depressed portion 14. The depth of the central depressed portion is determined by the type of handle used on the cover. The second depressed portion 16 need not extend to the central depression 14, but need only extend from the vent to the outer edge of the stacking surface. The stacking surface may be larger or smaller than the form shown, and may occupy any suitable part of the area of the cover and may be of any suitable configuration. It may be a continuous ring located inwardly of the edge of the cover, in which case the vent and vent valve would be located outwardly of such continuous ring and inwardly of the edge of the cover.

Any type of vent valve may be used, but I prefer, because of its simplicity, to use the well-known type illustrated in Fig. 3. In this type, the valve 17 is made of a single piece of metal and comprises a top 20 and a downwardly extending annular wall 21. Diametrically opposed slots 22 are provided in the annular wall 21 near the top thereof. The top 20 of the valve is of greater diameter than the annular wall 21, thus providing a stop or valve-seating surface 23. The valve is shown in Fig. 3 in the form which it has before it is inserted in the vent opening. After such insertion, the valve is secured in the vent opening by upsetting a portion of the annular wall 21, as shown at 24 in Fig. 1.

It will be seen that a plurality of utensils constructed in accordance with this invention may be stacked when in use. There is nothing in the construction of the utensils themselves which will limit the number of utensils which can be placed in a single stack, the only factor limiting this number being the space available. The bottom of a vessel 10 rests on the stacking surface 13 of the cover of the utensil next below it, and its cover in turn supports another vessel. The pressure that is built up within a utensil is relieved by means of the vent and valve 17 and the depressions in the cover to the atmosphere.

It will be obvious that the invention will be applied to any type of utensil and that it may take other forms than the preferred form shown, and I wish it to be understood that the invention is limited only as defined in the appended claims.

I claim:

1. A cooking utensil adapted for stacking in use and comprising a straight walled vessel and a cover, said cover having a stacking surface, an area lying below said stacking surface and extending to the edge of the cover, and a vent located in said low area.

2. A cooking utensil adapted for stacking in use and comprising a straight walled vessel and a cover, said cover having a substantially flat surface adjacent its edge, an area lying below the flat surface and extending to the edge of the cover, a vent located in said low area, and a vent valve located in said vent.

3. A cooking utensil adapted for stacking in use and comprising a straight walled vessel and a cover, said cover having a raised area adjacent its edge in the form of a discontinuous ring, a depressed portion extending through said discontinuous ring, and a vent located in an area below the plane of said discontinuous ring.

4. A cooking utensil adapted for stacking in use and comprising a straight walled vessel and a cover, said cover having a central depressed portion, a marginal raised portion, an intermediate portion extending to the outer edge of said marginal portion, and a vent located in said intermediate portion.

5. A cooking utensil adapted for stacking in use and comprising a straight walled vessel and a cover, said cover having an area extending to its edge and lying below the plane of the greater part of said edge, and a vent in said low area.

6. A cooking utensil adapted for stacking in use and comprising a straight walled vessel and a cover, said cover having an area extending to its edge and lying below the plane of the greater part of said edge, and a vent and pressure-responsive vent-closing valve in said area, said valve being adapted to lie below said plane in its open position.

EDWARD S. CISCO.